US006768843B1

(12) United States Patent
Sidick

(10) Patent No.: US 6,768,843 B1
(45) Date of Patent: Jul. 27, 2004

(54) CASCADED FOURIER FILTER INTERLEAVER HAVING ENHANCED PERFORMANCE

(75) Inventor: Erkin Sidick, San Ramon, CA (US)

(73) Assignee: Wavesplitter Technologies, Inc., Fremont, CA (US)

(*) Notice: Subject to any disclaimer, the term of this patent is extended or adjusted under 35 U.S.C. 154(b) by 89 days.

(21) Appl. No.: 10/222,303

(22) Filed: Aug. 16, 2002

(51) Int. Cl.[7] .............................................. G02B 6/26
(52) U.S. Cl. ............................ 385/39; 385/24; 385/27; 385/50
(58) Field of Search ................................. 385/9, 14, 15, 385/24, 27, 30, 39–42, 48, 50, 51

(56) References Cited

U.S. PATENT DOCUMENTS

| 5,247,594 A | * | 9/1993 | Okuno et al. ................. 385/17 |
| 5,309,534 A | * | 5/1994 | Cohen et al. ................. 385/27 |
| 5,596,661 A | | 1/1997 | Henry et al. ................. 385/24 |
| 5,719,976 A | * | 2/1998 | Henry et al. ................. 385/50 |
| 5,852,505 A | * | 12/1998 | Li .............................. 385/27 |
| 5,943,457 A | * | 8/1999 | Hayward et al. ............ 385/24 |
| 6,285,810 B1 | * | 9/2001 | Fincato et al. .............. 385/24 |
| 2001/0051018 A1 | * | 12/2001 | Arai et al. ................... 385/24 |
| 2002/0015554 A1 | * | 2/2002 | Oguma et al. ............... 385/24 |
| 2002/0106147 A1 | * | 8/2002 | Kitoh et al. ................. 385/24 |
| 2002/0181857 A1 | * | 12/2002 | Komatsu et al. ............ 385/24 |
| 2003/0031406 A1 | * | 2/2003 | Saida et al. ................. 385/27 |
| 2003/0035609 A1 | * | 2/2003 | Hatanaka ..................... 385/15 |
| 2003/0072522 A1 | * | 4/2003 | Zhao .......................... 385/27 |
| 2003/0165295 A1 | * | 9/2003 | Doerr ......................... 385/39 |
| 2003/0169964 A1 | * | 9/2003 | Wang et al. ................. 385/27 |
| 2003/0194184 A1 | * | 10/2003 | Carberry et al. ............ 385/39 |
| 2003/0198437 A1 | * | 10/2003 | Bouevitch et al. .......... 385/39 |

OTHER PUBLICATIONS

Joseph C. Chon et al., "High Capacity and High Speed DWDM and NWDM Optical Devices for Telecom and Datacom Applications," WaveSplitter Technologies Inc., n.d.
Joseph Chon et al., "Integrated Interleaver Technology Enables High Performance in DWDM Systems," National Fiber Optic Engineers Conference, 2001 Technical Proceedings, pp. 1410–1421.
Jerry Bautista et al., "Filter Technologies Vie for DWDM System Applications," Fiber Optics Online. May 14, 2002. www.fiberopticsonline.

* cited by examiner

*Primary Examiner*—Hemang Sanghavi
*Assistant Examiner*—Scott Alan Knauss
(74) *Attorney, Agent, or Firm*—Mayer Fortkort & Williams, PC; Stuart H. Mayer, Esq.

(57) ABSTRACT

A cascaded interleaver includes at least three two-stage Fourier filters. A first of the Fourier filters includes first and second waveguides such that the first waveguide has a longer optical path length than the second waveguide. A second of the Fourier filters includes third and fourth waveguides such that the third waveguide has a longer optical path length than the fourth waveguide. A third of the Fourier filters has fifth and sixth waveguides such that the fifth waveguide has a longer optical path length than the sixth waveguide. The third waveguide has an input coupled to an output of the first waveguide and the fifth waveguide has an input coupled to an output of the second waveguide. At least one of the Fourier filters include at least three couplers alternating with a delay path between adjacent ones of the couplers. A second of the couplers is of an order different from a first and third of the couplers. A $0^{th}$-order coupler has parallel waveguides with the shortest possible length for a given bar coupling ratio and a given signal wavelength. Likewise, a $1^{st}$-order coupler has parallel waveguides with the second shortest possible length for the same bar coupling ratio and signal wavelength.

12 Claims, 8 Drawing Sheets

A NON-CASCADED TWO-STAGE FOURIER FILTER INTERLEAVER

A NON-CASCADED TWO-STAGE FOURIER FILTER INTERLEAVER

THE METHOD FOR CASCADING 3 INTERLEAVERS TO MINIMIZE
THE CHROMATIC DISPERSION AND TO INCREASE LINE ISOLATION

COUPLING-RATIO DISPERSIONS OF THE 0th- AND THE 1st-ORDER 50% COUPLERS

COUPLING RATIO DISPERSION OF 3 PAIRS OF COUPLERS
WITH DIFFERENT COUPLING RATIOS. IN EACH CASE, THE
DISPERSION IS EVALUATED AT A WAVELENGTH OF 1550nm.

| COUPLER TYPE | 50%-COUPLER $D_\kappa(nm)^{-1}$ | 31%-COUPLER $D_\kappa(nm)^{-1}$ | 8%-COUPLER $D_\kappa(nm)^{-1}$ |
|---|---|---|---|
| 0th-ORDER | -0.00186 | -0.00187 | -0.00120 |
| 1st-ORDER | 0.00478 | 0.00442 | 0.00263 |

FIG. 6

CHARACTERISTICS OF COUPLERS IN THE 3 CONFIGURATIONS NUMERICALLY
EVALUATED IN THIS DOCUMENT. IN CONFIGURATION #1 THE COUPLERS DO
NOT HAVE ANY DISPERSION. ND = NORMAL DISPERSION (THE 0th-ORDER
COUPLER) AND DR = DISPERSION REVERSED (THE 1st-ORDER COUPLER).

| CONFIGURATION # | $K_{a1}$ | $K_{a2}$ | $K_{a3}$ | $K_{b1}$ | $K_{b2}$ | $K_{b3}$ |
|---|---|---|---|---|---|---|
| 1 | 0.50 | 0.31 | 0.08 | 0.50 | 0.31 | 0.08 |
| 2 | ND | ND | ND | ND | ND | ND |
| 3 | ND | DR | ND | DR | ND | DR |

FIG. 7

10 # CASCADED FOURIER FILTER INTERLEAVER HAVING ENHANCED PERFORMANCE

FIELD OF THE INVENTION

The present invention relates generally to WDM and DWDM communication systems, and more generally to an optical interleaver employed in such systems.

BACKGROUND OF THE INVENTION

Optical wavelength division multiplexing (WDM) and dense wavelength division multiplexing (WDM) have gradually become the standard backbone networks for fiber optic communication systems. WDM and DWDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM and DWDM technology.

One approach to increasing fiber optic capacity is to use more closely spaced channels. For example, at one point in time, 200 GHz spacing was common for optical channels. At that time optical components were designed to operate on 200 GHz spaced channels. As the state of the art improved, 100 GHz spacing was used for optical channels. Optical components were then designed to operate on 100 GHz spaced channels and devices designed to operate on 200 GHz spaced channels had to be replaced of modified to operate on the 100 GHz spaced channels. This upgrade requirement can be very expensive for parties with an extensive amount of fiber optic equipment that is already deployed.

An optical device that can be used for interfacing between different channel spacing schemes is known as an interleaver/deinterleaver, which is essentially an optical router that allows systems designed for operation at a wide channel spacing to be extended to systems designed for narrow channel spacings. In its simplest form, an interleaver combines two sets of channels into one densely packed set with half the channel spacing. Interleavers/deinterleavers are also used for other purposes, such as to add/drop channels at a node in such a way that one interleaver output adds/drops local channels while the other interleaver output forwards express channels to another node.

One type of interleaver/deinterleaver is based on unbalanced Mach-Zehnder interferometers or Fourier filters, which advantageously can be produced in the form of a planar lightguide circuit An example of an interleaver employing a Fourier filter is a nonlinear Fourier Filter Flat-top ($F^3T$) interleaver such as the WaveProcessor™ Interleaver available from WaveSplitter Technologies. An example of such an interleaver is shown, for example, in U.S. Pat. No. 5,596,661, which is hereby incorporated by reference in its entirety. One problem with an uncascaded Fourier filter interleaver when the channel spacing is less than about 50GHz is that it exhibits a large chromatic dispersion, which degrades system performance. To overcome this problem two or more identical Fourier filters are sometimes cascaded in the same lightpath, but this causes additional performance problems, including an increase in the transmission peak ripple and a narrowing of the effective pass-band width.

Accordingly, it would be desirable to provide an optical interleaver/deinterleaver based on a Fourier filter that has improved performance characteristics.

SUMMARY OF THE INVENTION

In accordance with the present invention, a planar lightguide circuit includes a fist pair of planar optical waveguides forming at least three couplers alternating with a delay path between adjacent ones of the couplers. Each of the delay paths include two segments of the planar optical waveguides having unequal optical path lengths. A second of the couplers is of an order different from a first and third of the couplers.

In accordance with one aspect of the invention, the second coupler is a $0^{th}$ order coupler and the first and the third couplers are $1^{st}$ order couplers. Alternatively, the second coupler may be a $1^{st}$ order coupler and the first and the third couplers may be $0^{th}$ order couplers.

In accordance with another aspect of the invention, the second coupler is located between the first and third couplers.

In accordance with yet another aspect of the invention, a second pair of planar optical waveguides forming at least three couplers alternating with a delay path between adjacent ones of the couplers is provided. Each of the delay paths include two segments of the planar optical waveguides having unequal optical path lengths. A first waveguide in the second pair of optical waveguides having a longest optical path length has an input optically coupled to an output of a second waveguide in the first pair of optical waveguides having a shortest optical path length. A second of the couplers formed by the second pair of waveguides is of an order different from a first and third of the couplers in the second pair of waveguides and from the second of the couplers formed by the first pair of waveguides.

In accordance with another aspect of the invention, a cascaded interleaver, includes at least three two-stage Fourier filters. A first of the Fourier filters includes first and second waveguides such that the first waveguide has a longer optical path length than the second waveguide. A second of the Fourier filters includes third and fourth waveguides such that the third waveguide has a longer optical path length than the fourth waveguide. A third of the Fourier filters has fifth and sixth waveguides such that the fifth waveguide has a longer optical path length than the sixth waveguide. The third waveguide has an input coupled to an output of the first waveguide and the fifth waveguide has an input coupled to an output of the second waveguide. At least one of the Fourier filters include at least three couplers alternating with a delay path between adjacent ones of the couplers. A second of the couplers is of an order different from a first and third of the couplers.

BRIEF DESCRIPTION OF THE DRAWINGS

FIG. 6 is a table listing the coupling ratio dispersion parameters $D_{78}$ for the three pairs of couplers indicated in FIG. 4.

FIG. 7 is a table listing the characteristics of the couplers used to determine the performance of three cascaded interleavers constructed in accordance with the present invention.

DETAILED DESCRIPTION

Figure 1:
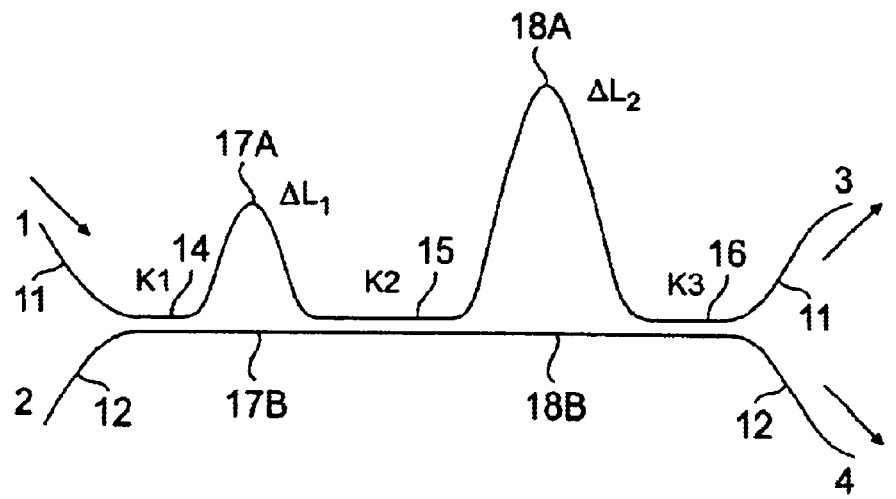
FIG. 1 is a schematic top view of a two-stage Fourier filter that may be used as an interleaver.

Referring to the drawings, FIG. 1 is a schematic top view of a two stage Fourier filter that may be used as an interleaver. The Fourier filter comprises a pair of planar optical waveguides 11 and 12 that are formed on a substrate 13 and which are configured to form three optical couplers 14, 15, and 16. Optical couplers 14 and 15 are connected by a delay path 17. Likewise, optical couplers 15 and 16 are connected by a delay path 18. Each coupler is comprised of a region of close adjacency of the two waveguides where the exponential tail of light transmitted on each of waveguides 11 and 12 interacts with the other, coupling light from one waveguide to the other. The amount of power coupled from one waveguide to the other is characterized by the cross coupling ratio, which is determined in part by the effective length of the coupler.

Each delay path comprises a pair of waveguide segments between two couplers, for example segments 17A and 17B between couplers 14 and 15. The segments are configured to provide unequal optical path lengths between the two couplers, thereby providing a differential delay. For example in FIG. 1 upper segment 17A is longer than lower segment 17B, providing a differential delay, which can be denoted positive. Likewise in FIG. 1, upper segment 18A is longer than lower segment 18B. Accordingly, since in FIG. 1 the upper segments of both delay paths are longer than the lower segments, waveguide 11 provides an overall longer optical path length than waveguide 12. Although not shown, differential delays associated with longer lower segments can be denoted negative.

The optical couplers 14, 15, and 16 can be characterized by their respective bar coupling ratios $\kappa_1$, $\kappa_2$ and $\kappa_3$, assuming that excess loss is negligible. If the optical path difference parameters of delay paths 17 and 18 are respectively denoted by $\Delta L_1$ and $\Delta L_2$, the optical path difference parameters can be further expressed as $$\Delta L_1 = \Delta L_0 + m_1 \lambda_0$$

$$\Delta L_2 = 2\Delta L_0 + m_2 \lambda_0$$

where $\lambda_0$ is the center wavelength of the band that is being employed (e.g., C- or L-band), $\Delta L_0$ is the optimum value of the optical path difference parameter for the delay path of the first stage of the two-stage Fourier filter (i.e., delay path 17), and $m_1$ and $m_2$ are integers. Thus, a two-stage Fourier filter is characterized by the following 5 physical parameters: $\kappa_1$, $\kappa_2$ and $\kappa_3$, $\Delta L_0$, $m_1$ and $m_2$. In an optimized two-stage Fourier filter $m_1 = m_2 = 0$ and its performance degrades as $m_1$ and $m_2$ deviate from zero. Because it is difficult to precisely control the fabrication of a planar waveguide with an optical path length that corresponds to $m_1 = m_2 = 0$, most interleavers are presently fabricated with optical path difference parameters having non-zero m-values.

The basic function of the two-stage Fourier filter is also illustrated in FIG. 1. As shown, a WDM signal received at port 1 is deinterleaved so that the even channels appear at port 3 and the odd channels appear at port 4. Moreover, if an odd set of channels is received at port 2, it will appear at port 3 so that they are multiplexed with the even wavelengths received from port 1.

Figure 2:
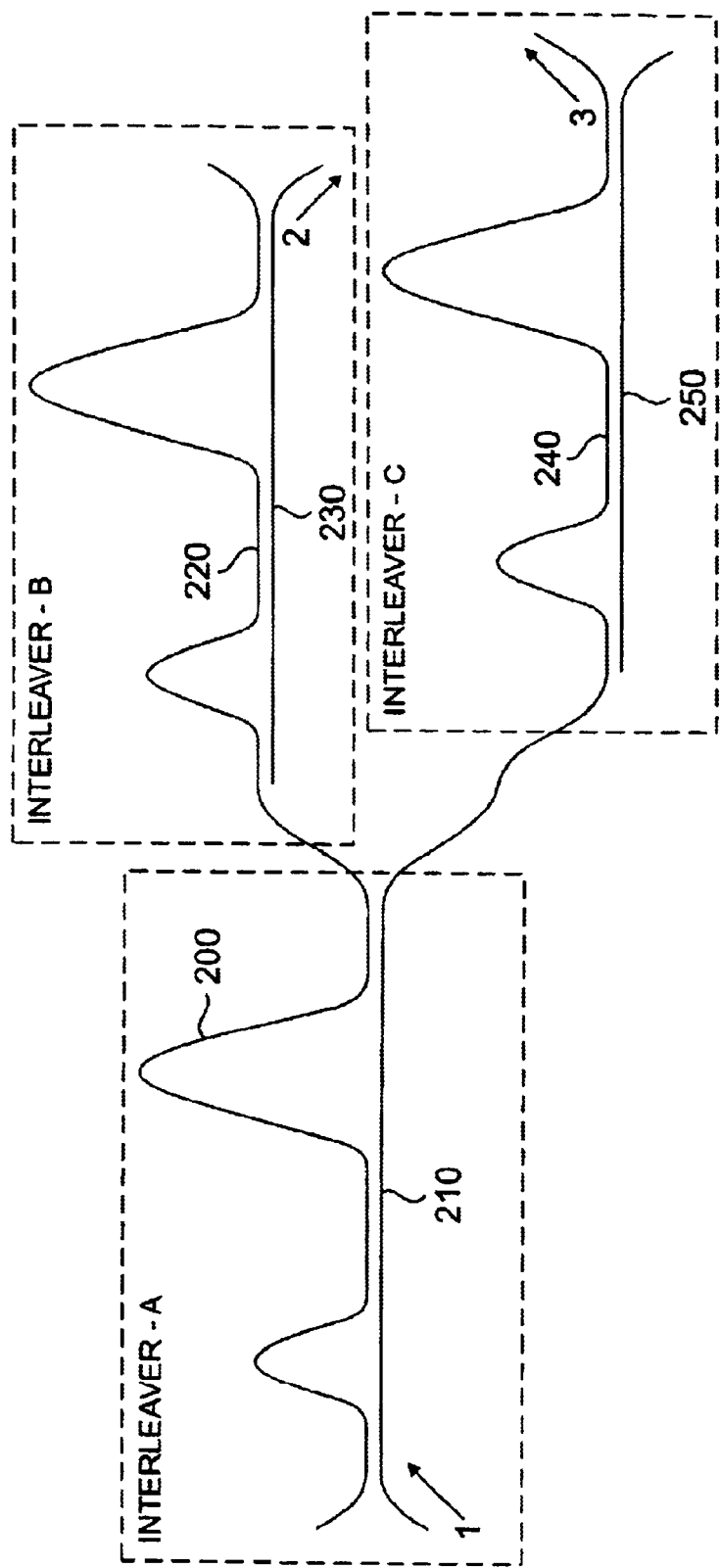
FIG. 2 shows a cascaded interleaver formed from three two-stage Fourier filters of the type shown in FIG. 1.

One problem with the Fourier filter depicted in FIG. 1 is that when narrow channel spacings are employed (e.g., 50 GHz or less) the filter exhibits an unacceptably large amount of chromatic dispersion. In order to reduce its chromatic dispersion as well as to improve its cross-talk or isolation, the Fourier filter may be cascaded to two or more other Fourier filters to provide a cascaded interleaver. For example, FIG. 2 shows a cascaded interleaver having three identical two-stage Fourier filters, which are denoted Fourier filters A, B and C. As shown, the output ports from interleaver A are respectively coupled to the longer optical path length waveguides 220 and 240 of interleavers B and C. Accordingly, the odd and even components of a signal received at the input port of the shorter optical path length waveguide 210 of interleaver A will appear on the output ports of the shorter optical path length waveguide 230 of interleaver B and the longer optical path length waveguide 240 of interleaver C, respectively. Unfortunately, as previously mentioned, cascading interleavers causes additional problems. In particular, the overall device performance is degraded with an increase in its transmission peak ripple and the narrowing of its effective pass-band width.

Figure 3:
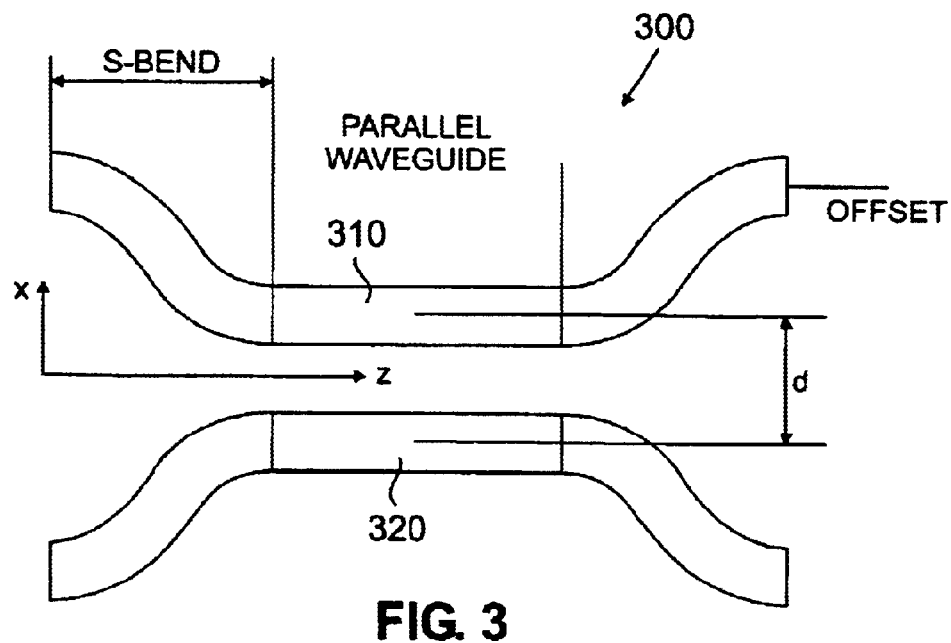
FIG. 3 shows an exemplary planar waveguide coupler that may be employed in the Fourier filters shown in FIGS. 1 and 2.
Figure 4:
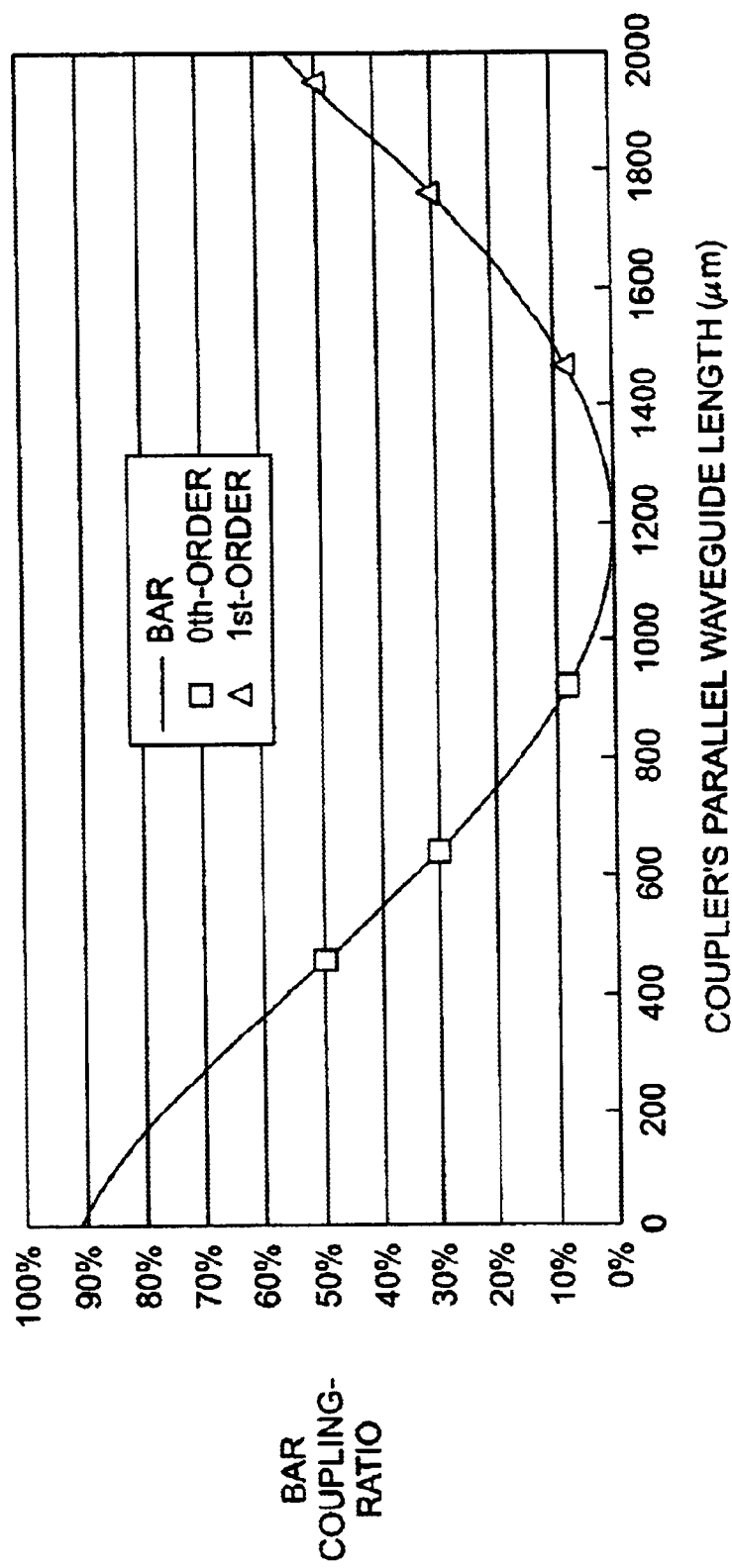
FIG. 4 is a graph showing the bar coupling ratio versus the length of the parallel waveguide portions for an exemplary waveguide coupler operating at a wavelength of 1550 nm.

FIG. 3 shows an exemplary planar waveguide coupler 300 that may be employed in Fourier filters. The coupling ratio of the device may be adjusted by changing the lengths of the parallel waveguides 310 and 320. For example, FIG. 4 shows the bar coupling ratio versus the length of the parallel waveguides 310 and 320 for a waveguide coupler operating at a wavelength of 1550 nm and having a typical set of physical parameters. As FIG. 4 indicates, a given coupling ratio can be achieved when the parallel waveguides 310 and 320 take on a number of different lengths. For instance, two waveguide lengths are indicated in FIG. 4 for a coupler having a bar coupling ratio of 50%, 31% and 8%. For a given bar coupling ratio and a given signal wavelength, the coupler having parallel waveguides with the shortest possible length is referred to herein as the $0^{th}$-order coupler. Likewise, for the same bar coupling ratio and signal wavelength, the coupler having parallel waveguides with the second shortest possible length is referred to herein as the $1^{st}$-order coupler.

Figure 5:
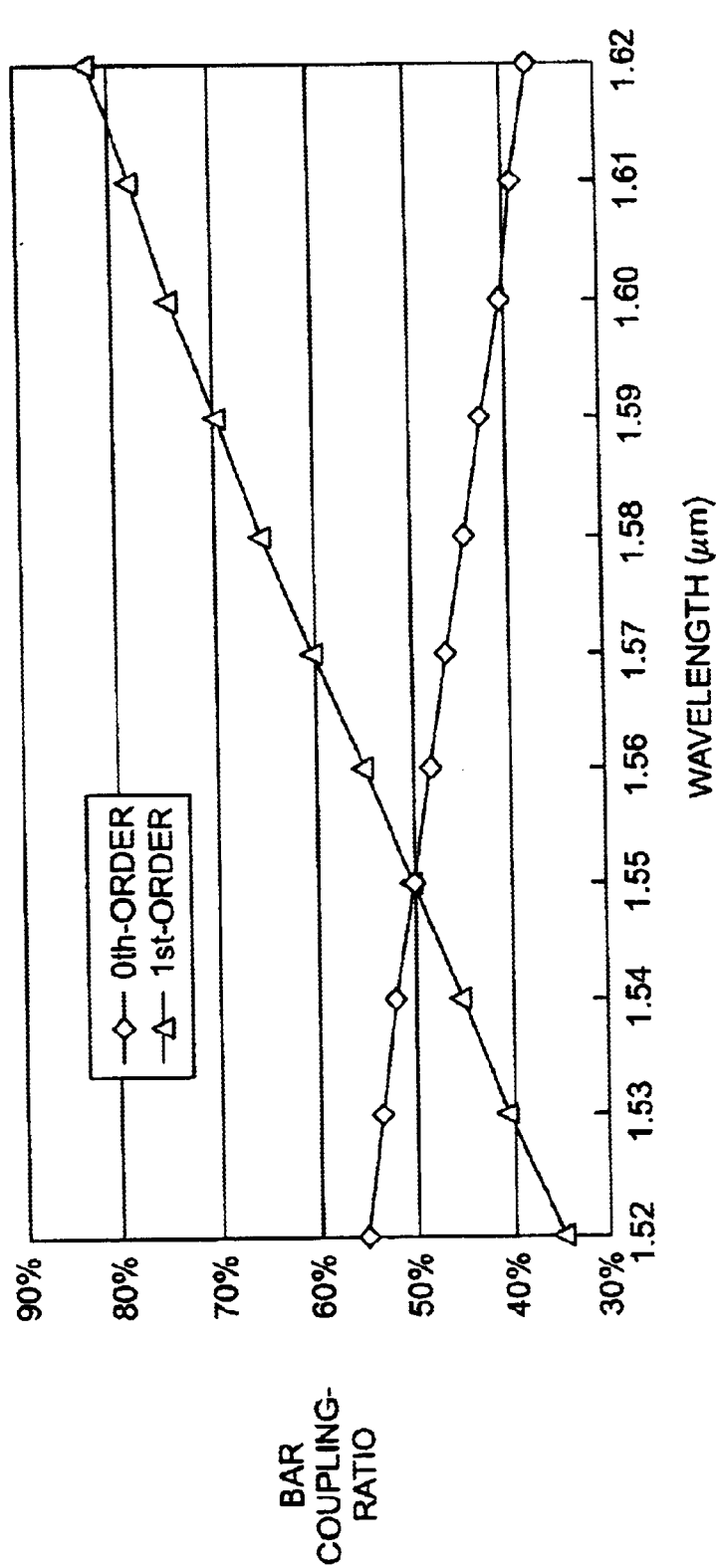
FIG. 5 is a graph showing the bar coupling ratio versus wavelength for the $0^{th}$ and $1^{st}$ order couplers which, in FIG. 4, are shown to have a coupling ratio of 50%.

Although a $0^{th}$ and $1^{st}$ order pair of couplers have the same bar coupling ratio at one particular wavelength (e.g., 1550 nm in FIG. 4), they behave quite differently when the wavelength is changed. For example, FIG. 5 shows the bar coupling ratio versus wavelength for the $0^{th}$ and $1^{st}$ order couplers which, in FIG. 4, are shown to have a coupling ratio of 50% at a wavelength of 1550 nm. Clearly, the bar coupling ratio of the different order couplers strongly depends on the wavelength. This dependence can be characterized by defining a coupling ratio dispersion parameter $$D_{78} = d\kappa/d\lambda$$

The coupling ratio dispersion parameters $D_{78}$ (also referred to herein simply as the "dispersion parameter") for the three pairs of couplers indicated in FIG. 4 are listed in the table of FIG. 6. As the table indicates, the coupling ratio dispersion parameter of the $0^{th}$ and $1^{st}$ order couplers have opposite signs and the magnitude of the dispersion parameter for the $1^{st}$ order coupler is more than twice that for the $0^{th}$ order coupler. Because of the large dispersion parameter $D_\kappa$ for the $1^{st}$ order coupler, conventional interferometric optical components such as Fourier filter interleavers generally employ only the $0^{th}$ order couplers. In particular, the cascaded interleaver shown in FIG. 2 has previously been formed from Fourier filters in which each individual coupler is a $0^{th}$ order coupler.

The present inventor has recognized that the previously mentioned performance degradation of a cascaded interleaver of the type shown in FIG. 2 is caused in part by the coupling ratio dispersion of the couplers. Moreover, the inventor has determined that this degradation in performance can be ameliorated by forming the two-stage Fourier filters employed in the cascaded interleaver from a combination of couplers with different orders to thereby partially compensate for the coupling ratio dispersion of the couplers.

Referring again to the cascaded interleaver shown in FIG. 2, consider the lightpath through interleavers A and B. Since this lightpath traverses six couplers, there are 64 different combinations of $0^{th}$ and $1^{st}$ order couplers that can be used in this lightpath. In accordance with the present invention, the transmission peak ripple and the effective pass-band width of the cascaded interleaver can be more nearly optimized if, for each of the individual interleavers, the sign of the bar coupling ratio dispersion parameter for the first and third couplers are equal to one another and opposite to the sign of the bar coupling ratio dispersion parameter for the second or intermediate coupler. Moreover, the sign of the dispersion parameter for the first and third couplers in interleaver A should be opposite to the sign of the dispersion parameter of the first and third couplers in interleavers B and C. Additionally, the sign of the dispersion parameter for the second coupler in interleaver A should be opposite to the sign of the second coupler in interleavers B and C. That is, since, as previously mentioned, the coupling ratio dispersion parameter of $0^{th}$ and $1^{st}$ order couplers are opposite in sign to one another, this criterion for improving performance can be satisfied if the second or intermediate coupler of interleaver A is of the opposite order from the order of the first and third couplers of interleaver A, which in turn are of the opposite order from the dispersion parameter of the fist and third couplers of interleavers B and C, while the second coupler of interleaver A is of the opposite order from the order of the second coupler in interleavers B and C. For example, in FIG. 2 interleaver A may comprise a first and third coupler of the $1^{st}$ order and a second coupler of the $0^{th}$ order while interleavers B and C may each comprise a first and third coupler of the $0^{th}$ order and a second coupler of the $1^{st}$ order (or visa versa).

The merits of the present invention were evaluated by examining a number of different cascaded interleavers and comparing their characteristics to one another. In particular, three sets of bar coupling ratio were specified, one set for each of the six couplers employed in interleavers A and B in FIG. 2. As indicated in FIG. 2, the bar coupling ratios of the couplers in interleaver A are denoted $\kappa_{a1}$, $\kappa_{a2}$ and $\kappa_{a3}$ while the coupling ratios of the coupler in interleaver B are denoted $\kappa_{b1}$, $\kappa_{b2}$ and $\kappa_{b3}$. FIG. 7 is a table listing the characteristics of the couplers used in the three cascaded interleavers that were examined. In the first case, $\kappa_{a1}=\kappa_{b1}=0.5$, $\kappa_{a2}=\kappa_{b2}=0.31$, and $\kappa_{a3}=\kappa_{b3}=0.08$. (It should be noted that this first case is somewhat unrealistic because the bar coupling ratios are independent of wavelength.) The second cascaded interleaver corresponds to a conventional arrangement in which all the couplers are $0^{th}$ order couplers. Finally, the third case corresponds to a cascaded interleaver constructed in accordance with the present invention in which the first and third couplers in interleavers A and the second coupler of interleaver B are $0^{th}$ order couplers and the second coupler in interleaver A and the first and third couplers in interleaver B are $0^{th}$ order couplers.

The m-values of the delay paths in the individual interleavers in each of the arrangements in FIG. 7 were varied in a four dimensional space from −2 to +2 in increments of 2 and the values of the isolation (at a channel spacing 50 GHz), the transmission peak ripple within the +/−10 GHz pass-band, and the effective pass-band half width were calculated. Since there are 4 m-values ($m_{a1}$, $m_{a2}$, $m_{b1}$ and $m_{b2}$) to be varied, there are a total of 625 combinations to be examined.

Figure 8A:
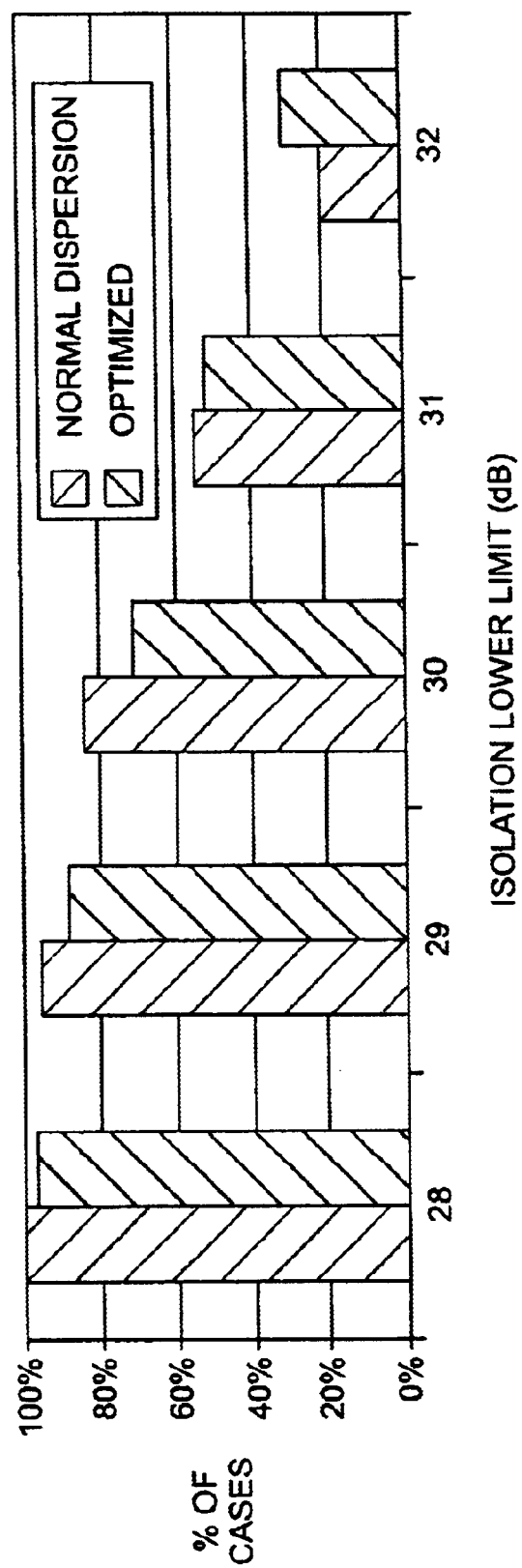
FIGS. 8(a), 8(b) and 8(c) compare the results of the isolation, ripple, and pass-band half width, respectively, for a series of conventional cascaded interleavers and a series of cascaded interleavers constructed in accordance with the present invention.
Figure 8B:
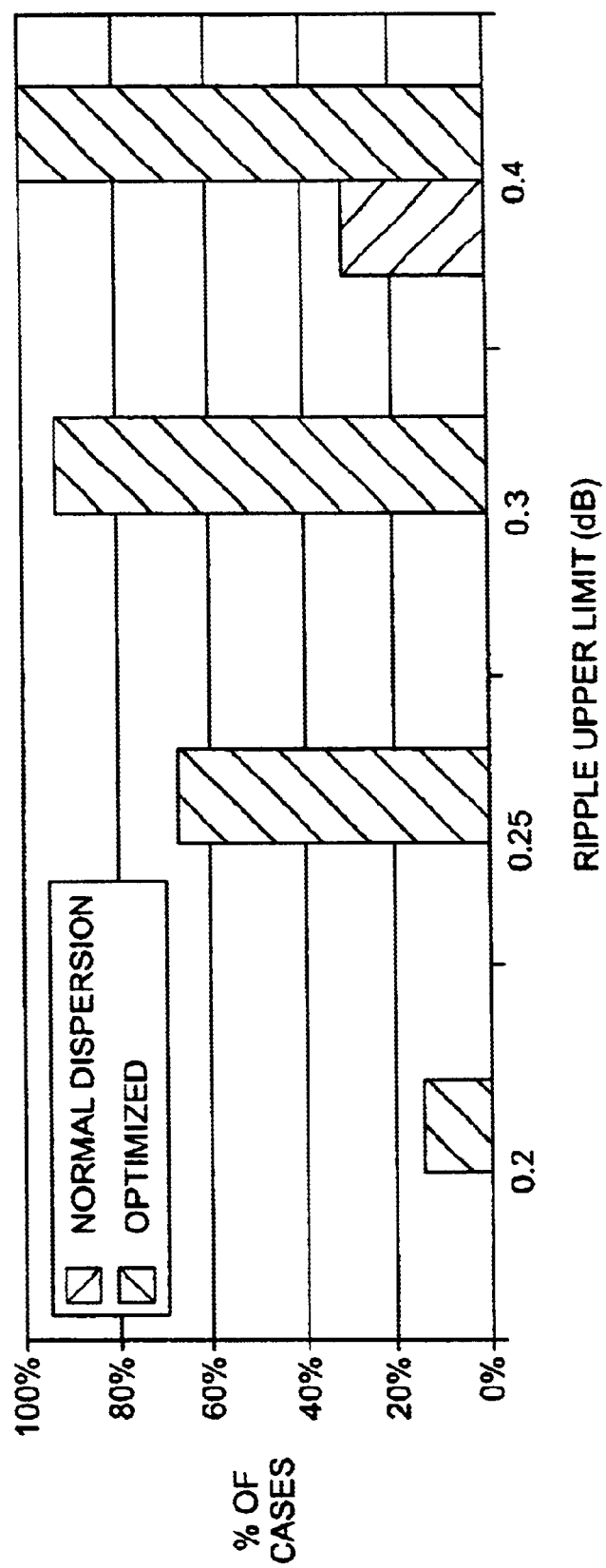
Figure 8C:
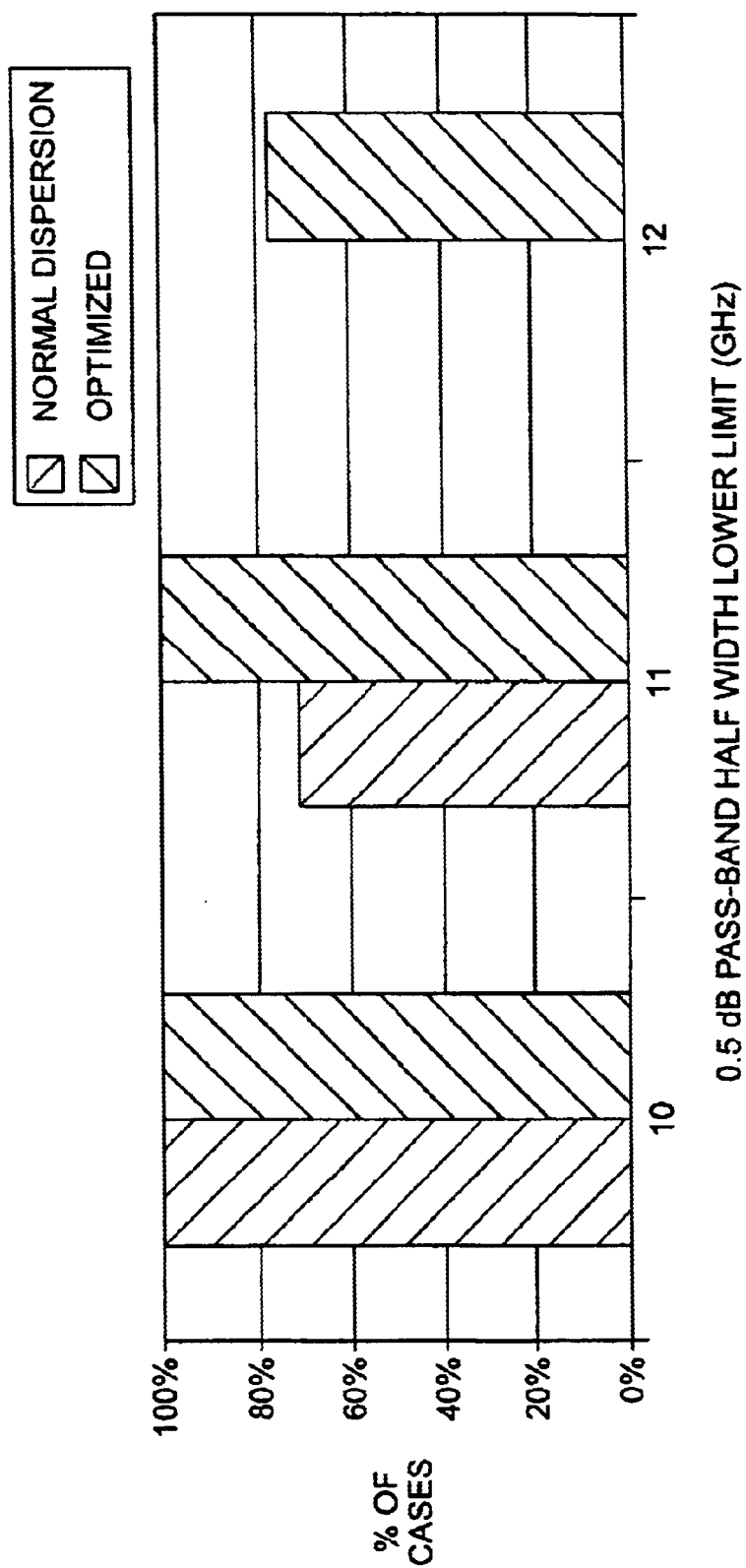

FIGS. 8($a$), 8($b$) and 8($c$) compare the results of the isolation, ripple, and pass-band half width at a level of 0.5 DB below the peaks at ITU grids, respectively, for the series of conventional cascaded interleavers and the series of inventive cascaded interleavers. FIG. 8($a$) shows the percentage of cases in which the isolation was found to be greater than the corresponding value specified on the x-axis. FIG. 8($b$) shows the percentage of cases in which ripple was found to be less than the corresponding value specified on the x-axis. Likewise, FIG. 8($c$) shows the percentage of cases in which the effective pass-band half width was found to be greater than the corresponding value specified on the x-axis. The results of the first cascaded interleaver listed in FIG. 7 are not presented because for all m-value combinations the cascaded interleaver exhibited an isolation greater than 32 dB, a ripple less than 0.2 dB and a pass-band half width greater than 12 GHz.

The results in FIGS. 8($a$)–8($c$) demonstrate that the present invention provides a significant performance advantage over the conventional cascaded interleaver arrangement. For example, none of the conventional arrangements have a ripple of less than 0.25 dB, while 67.4% of the inventive arrangements exhibited a ripple of less than 0.25 dB. Also, none of the conventional arrangements have an effective pass-band half width greater than 12 GHz, while 76.5% of the inventive arrangements exhibited a half width greater than 12 GHz.

What is claimed is:

1. A planar lightguide circuit, comprising:
   a first pair of planar optical waveguides forming at least three couplers alternating with a delay path between adjacent ones of the couplers, each of said delay paths including two segments of the planar optical waveguides having unequal optical path lengths; and
   wherein a second of the couplers is of an order different from a first and third of the couplers "wherein, the order of a coupler is defined by one of a plurality of coupling lengths at which a coupler has a particular bar coupling ratio".

2. The planar lightguide circuit of claim 1 wherein the second coupler is a $0^{th}$ order coupler and the first and the third couplers are $1^{st}$ order couplers.

3. The planar lightguide circuit of claim 1 wherein the second coupler is a $1^{st}$ order coupler and the first and the third couplers are $0^{th}$ order couplers.

4. The planar lightguide circuit of claim 2 wherein the second coupler is located between the first and third couplers.

5. The planar lightguide circuit of claim 3 wherein the second coupler is located between the first and third couplers.

6. The planar lightguide circuit of claim 1 further comprising:
   a second pair of planar optical waveguides forming at least three couplers alternating with a delay path between adjacent ones of the couplers, each of said delay paths including two segments of the planar optical waveguides having unequal optical path lengths, a first waveguide in the second pair of optical waveguides having a longest optical path length and having an input optically coupled to an output of a second waveguide in the first pair of optical waveguides having a shortest optical path length; and wherein a second of the couplers formed by the second pair of waveguides is of an order different from a first and third of the couplers in the second pair of waveguides and from the second of the couplers formed by the first pair of waveguides.

7. A cascaded interleaver, comprising at least three two-stage Fourier filters, a first of the Fourier filters having first and second waveguides such that the first waveguide has a longer optical path length than the second waveguide, a second of the Fourier filters having third and fourth waveguides such that the third waveguide has a longer optical path length than the fourth waveguide, a third of the Fourier filters having fifth and sixth waveguides such that the fifth waveguide has a longer optical path length than the sixth waveguide, said third waveguide having an input coupled to an output of the first waveguide and said fifth waveguide having an input coupled to an output of the second waveguide; and wherein at least one of the Fourier filters include at least three couplers alternating with a delay path between adjacent ones of the couplers, a second of the couplers being of an order different from a first and third of the couplers "wherein, the order of a coupler is defined by one of a plurality of coupling lengths at which a coupler has a particular bar coupling ratio".

8. The cascaded interleaver of claim 7 wherein each of said three Fourier filters include at least three couplers alternating with a delay path between adjacent ones of the couplers, a second of the couplers in each of the Fourier filters being of an order different from a first and third of the couplers in each of the Fourier filters, the first and third couplers in the first Fourier filter being of an order different from the first and third couplers in both the second and the third Fourier filters.

9. The cascaded interleaver of claim 7 wherein the second coupler is a $0^{th}$ order coupler and the first and the third couplers are $1^{st}$ order couplers.

10. The cascaded interleaver of claim 7 wherein the second coupler is a $1^{st}$ order coupler and the first and the third couplers are $0^{th}$ order couplers.

11. The cascaded interleaver of claim 9 wherein the second coupler is located between the first and third couplers.

12. The planar lightguide circuit of claim 10 wherein the second coupler is located between the first and third couplers.

* * * * *

UNITED STATES PATENT AND TRADEMARK OFFICE
CERTIFICATE OF CORRECTION

PATENT NO.    : 6,768,843 B1
DATED         : July 27, 2004
INVENTOR(S)   : Erkin Sidick It is certified that error appears in the above-identified patent and that said Letters Patent is hereby corrected as shown below:

Column 1,
Line 11, after "dense wavelength division multiplexing", change "(WDM)" to -- (DWDM) --.
Line 30, after "be replaced", change "of" to -- or --.

Column 2,
Line 3, after "includes a", change "fist" to -- first --.
Line 34, delete comma after "interleaver".
Line 67, after first word "parameters", change "$D_{78}$" to -- $D_\kappa$ --.

Column 4,
Line 56, first element of equation, change "$D_{78}$" to -- $D_\kappa$ --.
Line 57, after "parameters", change "$D_{78}$" to -- $D_\kappa$ --.
Line 65, change "$D_\kappa$for" to -- $D_\kappa$ for --.

Column 5,
Line 37, after "of the", change "fist" to -- first --.
Line 45, after "order", change "(or visa versa)" to -- (or vice versa) --.
Line 67, after "B are", change "$0^{th}$" to -- $1^{st}$ --.

Column 6,
Line 12, first word "DB", change to -- dB --.
Line 45, delete the open quotation mark preceding "wherein".
Line 48, delete close quotation mark after "ratio".

UNITED STATES PATENT AND TRADEMARK OFFICE
CERTIFICATE OF CORRECTION

PATENT NO. : 6,768,843 B1
DATED : July 27, 2004
INVENTOR(S) : Erkin Sidick

It is certified that error appears in the above-identified patent and that said Letters Patent is hereby corrected as shown below:

<u>Column 8,</u>
Line 2, delete the open quotation mark preceding "wherein".
Line 4, delete the close quotation mark after "ratio".

Signed and Sealed this

Thirtieth Day of November, 2004

JON W. DUDAS
*Director of the United States Patent and Trademark Office*